Sept. 1, 1931.  C. W. HICKS  1,821,513
ROTARY ENGINE
Filed March 18, 1930    2 Sheets-Sheet 1

INVENTOR:
Cyrus W. Hicks
By Macleod, Calver, Copeland & Dike
Att'ys

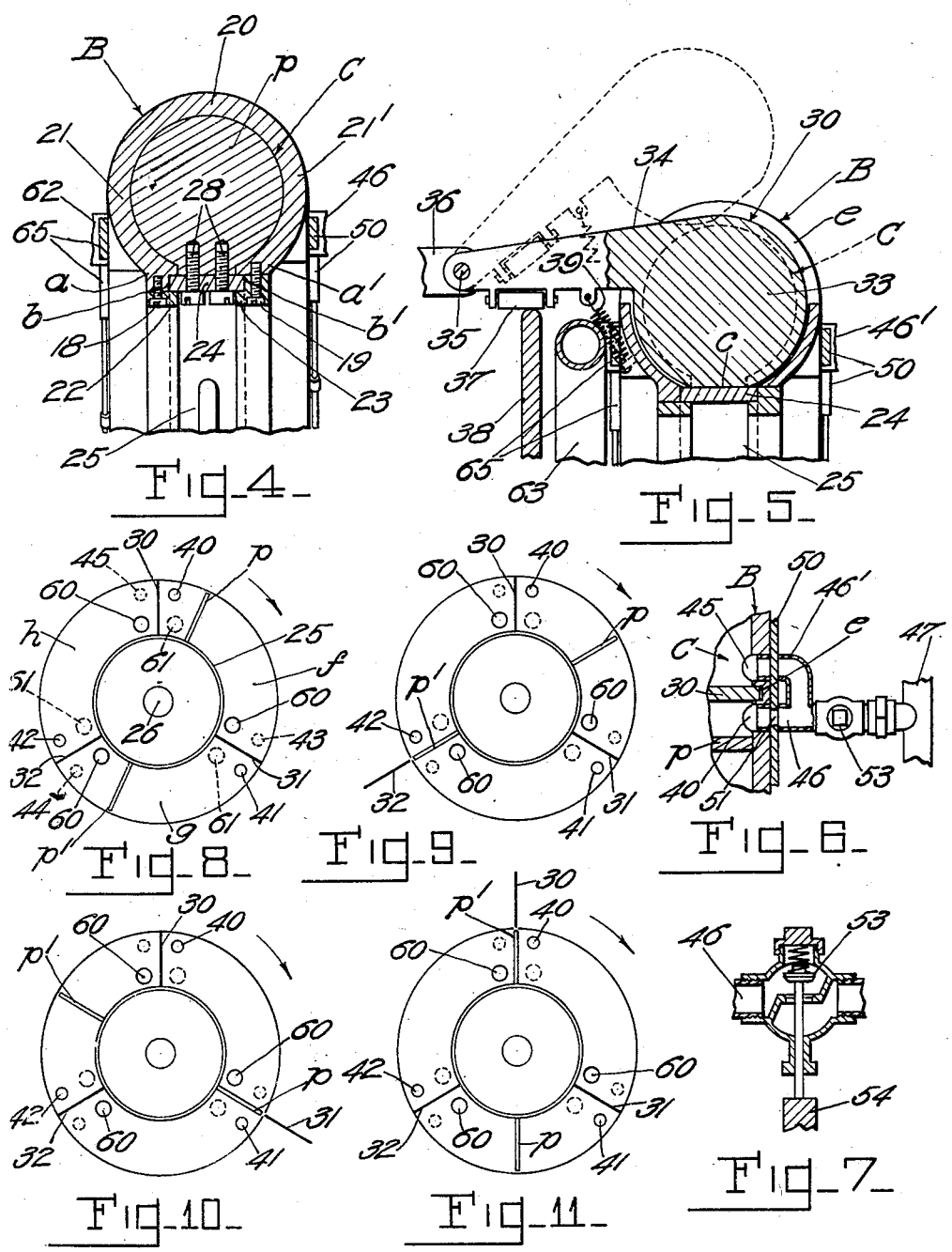

Patented Sept. 1, 1931

1,821,513

UNITED STATES PATENT OFFICE

CYRUS W. HICKS, OF WALTHAM, MASSACHUSETTS

ROTARY ENGINE

Application filed March 18, 1930. Serial No. 436,711.

The invention relates to a new and useful improvement in rotary engines. One object of the invention is to provide a ring-shaped cylinder with an annular piston wheel which performs the function of a piston rod and carries a plurality of pistons.

One feature of the invention consists in the combination of an annular stationary cylinder formed with a slot in its inner periphery in combination with a rotary piston wheel which serves as a closure for said slot and which has on its outer periphery a plurality of piston members which extend crosswise of the passage in said cylinder. Another feature of the invention relates to the valves for controlling the admission and exhaust of the motive fluid. Another feature relates to the means for actuating the valves. Other features will be more particularly set forth hereinafter.

This invention will be more clearly understood when taken in connection with the accompanying drawings and the novel features thereof clearly pointed out and defined in the claims at the close of this specification.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings:

Fig. 1 is a side elevation of a rotary engine embodying the invention.

Figs. 2 and 3 are sectional views taken on the lines 2—2 and 3—3 respectively of Fig. 1.

Figs. 4 and 5 are sectional views taken on the lines 4—4 and 5—5 respectively of Fig. 2.

Fig. 6 is a fragmentary view partly in section taken on the line 6—6 of Fig. 1.

Fig. 7 is a section of an inlet valve taken on the line 7—7 of Fig. 2.

Figs. 8 to 11 inclusive are diagrams illustrating the cycle of operation.

Figure 1:
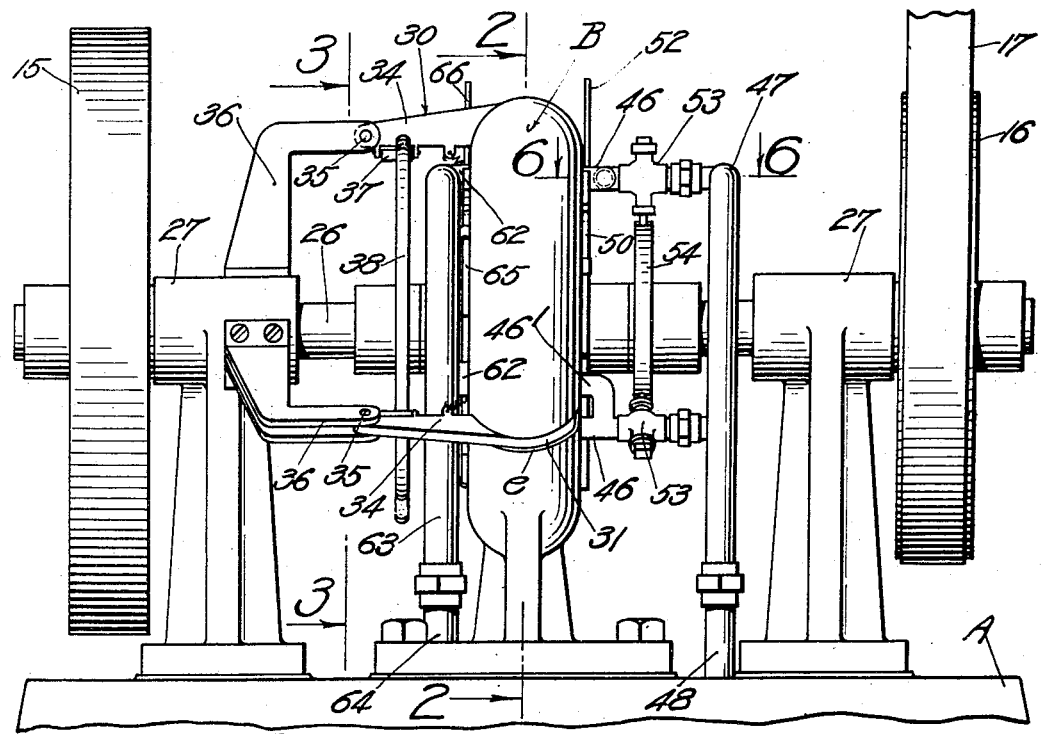
Figures 2, 3:
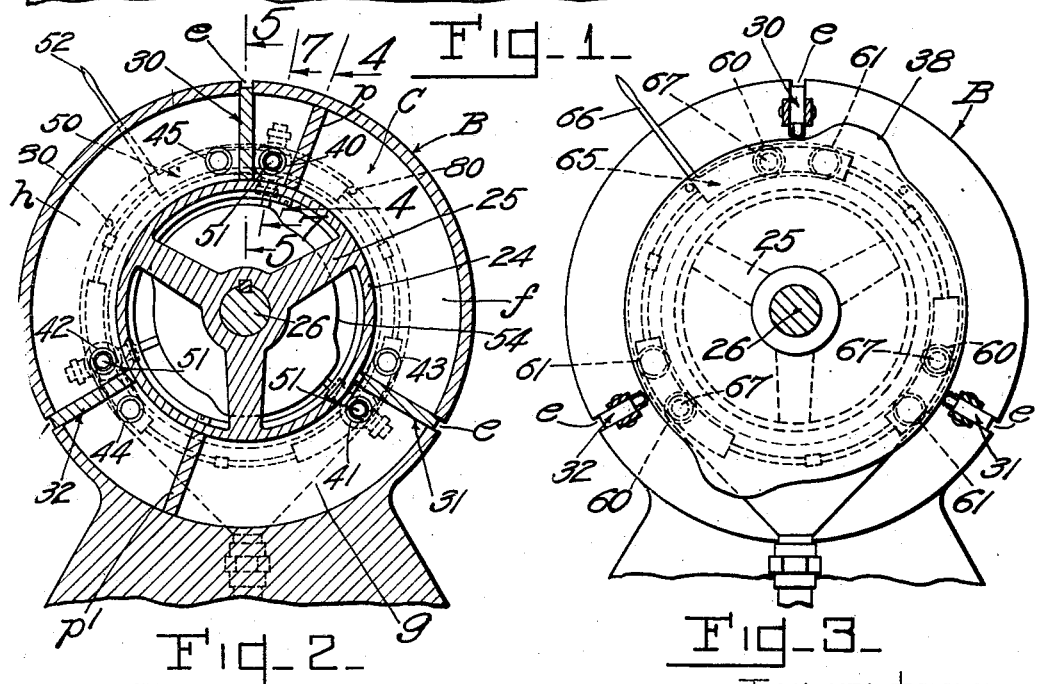

Referring to Figs. 1 to 7 inclusive of the drawings, there is shown at A the engine base which has rigidly secured thereto by bolts or other means, a hollow annular casing B. The casing B (see particularly Fig. 4) comprises an outer or peripheral wall 20 and side walls 21, 21' which extend inwardly and terminate in edges $a$ and $a'$, spaced apart to give to said casing a cross section generally similar to that of an automobile tire. The inner edge $a$ of the wall 21 is provided with an annular groove or way $b$ which opens inwardly therefrom lengthwise of said casing and is formed partly by a recess in said wall and partly by the outer surface of an annular cap 22 removably secured thereto by screws 18. The inner edge $a'$ of the wall 21' is also provided with an annular groove or way $b'$ which opens inwardly therefrom towards the way $b$ and is formed partly by the inner end surface of said wall and partly by a recess formed in the edge of an annular cap 23 removably secured thereto by screws 19. The ways $b$ and $b'$ are so arranged as to cooperate with each other and are adapted to receive for rotation therein the flanged rim 24 of a wheel 25 keyed or otherwise secured to the main shaft 26 which extends through the casing B in co-axial relation therewith and is journaled in bearings in standards 27, 27 secured to the base at either side of said casing.

The foregoing construction permits the quick assembly of these parts wherein it is only necessary to locate the flange 24 of the wheel 25 in the way $b$ and then attach both caps which prevents relative movement of these parts.

A flywheel 15 is secured to one end of the main shaft 26 and a pulley 16 is secured to the other end of said main shaft. At 17 is shown a driving belt which runs over the pulley 16 and may be connected to a counter shaft (not shown) or may be otherwise employed.

The rim 24 of the wheel 25 together with the casing B form therebetween an annular chamber or cylinder C for steam or other motive fluid which is adapted to receive for rotation therein two pistons $p$ and $p'$. The pistons $p$ and $p'$ are secured at their inner edges by screws 28 to the rim 24 of the wheel 25 in diametrically opposed relation and are shaped to conform to the cross sectional contour of the cylinder C in which they have a running fit.

The casing B is provided at equidistant intervals with a series of radial slots which extend through the outer wall 20 and a portion of the side walls 21, 21' thereof. These slots indicated at $e$ in the drawings are preferably three in number being spaced at intervals of 120° and are adapted to receive abutments or gate valves 30, 31 and 32 which normally divide the cylinder C into three compartments $f$, $g$ and $h$ (see particularly Fig. 2). Each of the gate valves (see Fig. 5) comprises a blade portion 33 preferably circular in general shape and of slightly greater diameter than that of the cylinder C and an operating lever 34 preferably formed integral therewith and extending therefrom through the walls of the casing B where it is pivoted as indicated at 35 to a bracket 36 secured to one of the standards 27. The blade portion 33 is provided at its innermost edge with a flattened portion $c$ which is adapted when said valve is closed to be seated on the flange 24 of the wheel 25 whereby each valve forms a seal between two adjacent compartments.

The gate valves 30, 31, and 32 are adapted to be moved into and out of the slots $e$ at intervals during the cycle of operation and for this purpose the lever 34 of each valve is provided with a roller 37 which is adapted to be engaged by a cam 38 secured to the main shaft 26 previously referred to. A spring 39 (see Fig. 5) secured at one end to the lever 34 and at its other end to the casing B tends to hold each of the valves normally closed as indicated in full lines in Fig. 2.

In order to insert the pistons $p$ and $p'$ in the cylinder while installing the apparatus one of the gate valves 30, 31 or 32 should be moved out of crosswise position of the cylinder shown in full lines in Fig. 5 to a position somewhat further back than the dotted line position shown in said figure, thus leaving the entrance to the slot $e$ entirely free. Then the piston $p$ which is in the form of a disk can be inserted through the slot into the chamber of the cylinder C and moved in the cylinder until the screw holes in the piston come into alinement with the screw holes in the rim 24 of the wheel, then the screws 28 can easily be inserted in the screw holes in the rim 24 and then screwed into the holes in the periphery of the piston as shown in Fig. 4. In similar manner the piston $p'$ can be inserted into position by turning one of the gate valves back on its pivot and the piston then suitably positioned with relation to the screw holes in the rim and the screws then inserted. As it is open work between the spokes of the wheel 25 of which the rim 24 is a part, it is very easy of access on the part of the workman, who is assembling parts of the wheel.

The compartments $f$, $g$ and $h$ are provided with a series of intake ports 40, 41 and 42 respectively for the admission of steam or other motive fluid to drive the pistons $p$ and $p'$ and consequently drive the main shaft 26 in one direction. The said compartments are provided with a second series of intake ports 43, 44 and 45 respectively to drive said pistons and shaft in a reverse direction. Both series of intake ports are preferably located on the same side of the casing B and as shown extend through the wall 21' thereof. The ports of the series 40, 41 and 42 are located at the ends of the compartments $f$, $g$ and $h$ in corresponding relation thereto while the ports of the series 43, 44, and 45 are located in corresponding relation at the opposite ends of said compartments.

Each port of the series 40, 41 and 42 is connected by a pipe 46 with an intake manifold 47 which receives steam through a pipe 48, (see Fig. 1) from a suitable source of supply not shown. Each pipe 46 (see particularly Fig. 6) is connected with the adjacent intake port of the series 43, 44 and 45 by a branch pipe 46'. An annular slide valve 50, (see Figs. 1 and 2) is mounted to move transversely through the pipes 46 and 46' adjacent their point of connection with the casing B and is provided with a series of holes 51 therein which when in registration with the passage in one of the pipes permits intake of steam. Said valve is provided with an operating handle 52 (see Figs. 1, 2 and 6) and is adapted to control the flow of steam from said pipes to either series of intake ports depending on the direction in which it is desired to operate the engine. Pins 80 (see Fig. 2) projecting from the casing B into the path of movement of the slide valve 50 are engaged thereby to limit the movement of said valve in each direction and thus insure the registration of the holes 51 therein with either series of intake ports. Inlet valves 53 installed in the pipes 46 and operated in proper sequence by a cam 54 secured to the main shaft 26 control the admission of steam or other fluid or gas to said pipes which as previously stated is further controlled by the slide valve 50 to be admitted to either series of intake ports depending on the direction in which the engine is to be operated. (See Figs. 1, 6 and 7.)

The compartments $f$, $g$ and $h$ are also provided with two series of exhaust ports indicated at 60 and 61 which are preferably located in the wall 21 of the casing B. Each compartment is provided with one port of each series, said ports being located at the opposite ends thereof. The ports of both series are connected by pipes 62 with an exhaust manifold 63 which is provided with an exhaust pipe 64. (See Figs. 1, 4, and 5.)

An annular slide valve 65 (see Figs. 1 and 2) similar in construction and operation to the slide valve 50 previously referred to is mounted to move crosswise through the pipes 62 adjacent their point of connection with the casing B. Said valve is provided with a series of holes 67 and is manually operated by a handle 66 to open or close either series of exhaust ports 60 or 61 and thus permit the exhaust through one series of ports while the other series is closed to permit the operation of the engine.

The operation of the rotary engine described as one embodiment of the present invention will best be understood by referring to the diagrams shown in Figs. 8 to 11 inclusive which illustrate the operating cycle thereof. It will be assumed that the engine is started in the direction of the arrow from the position shown in Fig. 8 which corresponds to the actual position of the parts shown in Fig. 2. At this time the slide valve 50 is set to open the intake ports 40, 41 and 42 and the slide valve 65 is set to open the exhaust ports 60. Due to the action of the cam 54 on the inlet valves 53, steam is now entering the compartment $f$ through the intake port 40 and due to operation of the steam it is moving the piston $p$ and consequently the piston $p'$. Just before the piston $p'$ reaches the gate valve 32, said valve is acted upon by the cam 38 and is turned from its operative or closed position (such a position being shown in full lines in Fig. 5) to its inoperative or open position (shown in dotted lines in said figure). This position of the gate valve 32 is shown in the diagram of Fig. 9 and permits the piston $p'$ to pass. Immediately thereafter the gate valve 32 is closed by the action of the spring 39. The pistons continue to move in the same direction due to the operation of the steam entering the compartment $f$ through the intake port 40 until the inlet valve controlling this port is closed by the action of the cam 54, at which time or slightly previous thereto. the inlet valve controlling the intake port 42 has been opened and the pistons are now moved by the action of the steam entering this port. As the piston $p$ approaches the gate valve 31, this valve is opened in a similar manner to the operation of the gate valve 32, thus permitting said piston to pass. This position of the gate valve 31 is shown in Fig. 10. Immediately thereafter this valve is closed and in turn the intake port 42 is closed and the intake port 41 opened. As the piston $p'$ approaches the gate valve 30 this valve is operated in the above described manner to permit the passage of said piston as shown in Fig. 11 and the completion of the operating cycle.

To reverse the engine it is simply necessary to operate the slide valve 50 through its handle 52 to close the series of intake ports 40, 41 and 42, and open the series of intake ports 43, 44 and 45, and also to operate the slide valve 65 through its handle 66 to close the exhaust ports 60 and open the exhaust ports 61. Thereafter when the engine is started in a reverse direction to that previously described the action of the inlet valves and gate valves will be similar but in a different sequence.

I claim:

1. In a rotary engine, a tubular cylinder of annular form having a slot throughout the length of its inner periphery, a rotary piston wheel coaxial with said cylinder and having a flange rim adapted to close the space between the sides of said slot, grooved ways at the opposite sides of said slot, said wheel rim engaging with and moving in said ways while maintaining a closure of said slot, one of said ways being formed by a flange member detachably connected with one of the side walls of said slot whereby the wheel is permitted to be readily assembled with and detached from the cylinder.

2. In a rotary engine, a stationary tubular cylinder of annular form having a slot which forms a channel through the entire length of its inner periphery, a rotary piston wheel coaxial with said cylinder and having a rim adapted to close the space between the side walls of said slot, grooved ways at the opposite sides of said slot, one of said ways being formed by a separable annular flange member in cooperation with one of the side walls of said slot to which said flange member is detachably connected, said wheel rim engaging with and moving in said ways while maintaining a closure of said slot.

3. In a rotary engine, a stationary tubular cylinder of annular form having a slot throughout the length of its inner periphery, a rotary piston wheel coaxial with said cylinder and having a flange rim adapted to close the space between the sides of said slot, grooved ways at the opposite sides of said slot, said flange rim engaging with and moving in said ways, one of said ways being formed by a flange member detachably connected with one of the side walls of said slot whereby the wheel is permitted to be readily assembled with and detached from the cylinder, the rim of the wheel carrying a plurality of piston members which extend transversely of the passage through the cylinder and form movable partitions therein, a plurality of pivotally mounted disk valves, said cylinder having in its periphery slots which form ways in which said valves are adapted to be moved into and out of closing position, and means whereby said valves are moved out of closure position at predetermined times during the rotation of the wheel.

4. In a rotary engine, a tubular cylinder of annular form having a slot which forms a channel through the entire length of its inner periphery, a rotary piston wheel coaxial with said cylinder and having a rim adapted to close the space between the side walls of said slot, grooved ways at the opposite side edges of said slot, one of said ways being formed by a separable ring member in co-operation with one of the side walls of said slot and means for detachably connecting said ring member with the side walls of said slot, said wheel rim engaging with and moving in said ways while maintaining a closure of said slot.

5. In a rotary engine, a stationary tubular cylinder of annular form having a slot which forms a channel through the entire length of its inner periphery, a rotary piston wheel coaxial with said cylinder and having a rim adapted to close the space between the side walls of said slot, grooved ways at the opposite sides of said slot, said ways being formed by detachable flange members in cooperation with the side walls of said slot to which said flange member is detachably connected, and means for detachably connecting said flange members with said side walls, said wheel rim engaging with and moving in said ways while maintaining a closure of said slot.

6. In a rotary engine, a stationary tubular cylinder of annular form having a slot which forms a channel through the entire length of its inner periphery, a rotary piston wheel coaxial with said cylinder and having a rim adapted to close the space between the side walls of said slot, grooved ways at the opposite sides of said slot, one of said ways being formed by an annular flange member in cooperation with one of the side walls of said slot, means for detachably connecting said flange member with said side wall, said wheel rim engaging with and moving in said ways while maintaining a closure of slot, the rim of the wheel carrying a plurality of piston members which extend transversely of the passage through the cylinder, a plurality of pivotally mounted disk valves, said cylinder having in its periphery slots which form ways in which said valves are adapted to be moved into and out of closing position transversely of the cylinder and means whereby said valves are moved out of closure position at predetermined times during the rotation of the wheel.

In testimony whereof I affix my signature.

CYRUS W. HICKS.